United States Patent [19]
Kohlen et al.

[11] Patent Number: 5,337,882
[45] Date of Patent: Aug. 16, 1994

[54] TRANSPORT SYSTEM FOR MUTUALLY INDEPENDENT CADDIES

[75] Inventors: Helmut Kohlen, Erkelenz; Helmuth Hensen; Karl-Heinz Floh, both of Mönchengladbach, all of Fed. Rep. of Germany

[73] Assignee: W. Schlafhorst AG & Co., Moenchengladbach, Fed. Rep. of Germany

[21] Appl. No.: 24,689

[22] Filed: Mar. 1, 1993

[30] Foreign Application Priority Data

Feb. 29, 1992 [DE] Fed. Rep. of Germany ....... 4206406

[51] Int. Cl.$^5$ ............................................. B65G 47/12
[52] U.S. Cl. ................................... 198/452; 198/455
[58] Field of Search ............... 198/448, 452, 454, 455; 242/35.5 A

[56] References Cited

U.S. PATENT DOCUMENTS

| | | | |
|---|---|---|---|
| 2,389,696 | 11/1945 | Stiles | 198/452 |
| 2,560,995 | 7/1951 | Stiles | 198/455 |
| 2,743,807 | 5/1956 | McKune | 198/454 |
| 3,610,396 | 10/1971 | Babunovic | 198/454 |

FOREIGN PATENT DOCUMENTS

| | | |
|---|---|---|
| 3207290 | 10/1982 | Fed. Rep. of Germany . |
| 3213253 | 12/1984 | Fed. Rep. of Germany . |
| 3815831 | 12/1988 | Fed. Rep. of Germany . |
| 3919526 | 12/1990 | Fed. Rep. of Germany . |
| 4106827 | 9/1991 | Fed. Rep. of Germany . |
| 4016465 | 11/1991 | Fed. Rep. of Germany . |
| 4019100 | 12/1991 | Fed. Rep. of Germany . |
| 0098019 | 7/1980 | Japan ................................. 198/455 |
| 0660186 | 10/1951 | United Kingdom ................ 198/455 |

*Primary Examiner*—James R. Bidwell
*Attorney, Agent, or Firm*—Herbert L. Lerner; Laurence A. Greenberg

[57] ABSTRACT

A transport system for mutually independent caddies carrying bobbins or bobbin tubes and having base plates, includes one transport path and another transport path entering the one transport path at a converging point. Moving surfaces, in particular surfaces of conveyor belts, carry the caddies along the transport paths by frictional engagement, with the caddies standing on the base plates. At least one additional contact surface is disposed at the converging point for touching a caddy passing through the converging point and imposing an additional motion component upon the caddy.

6 Claims, 4 Drawing Sheets

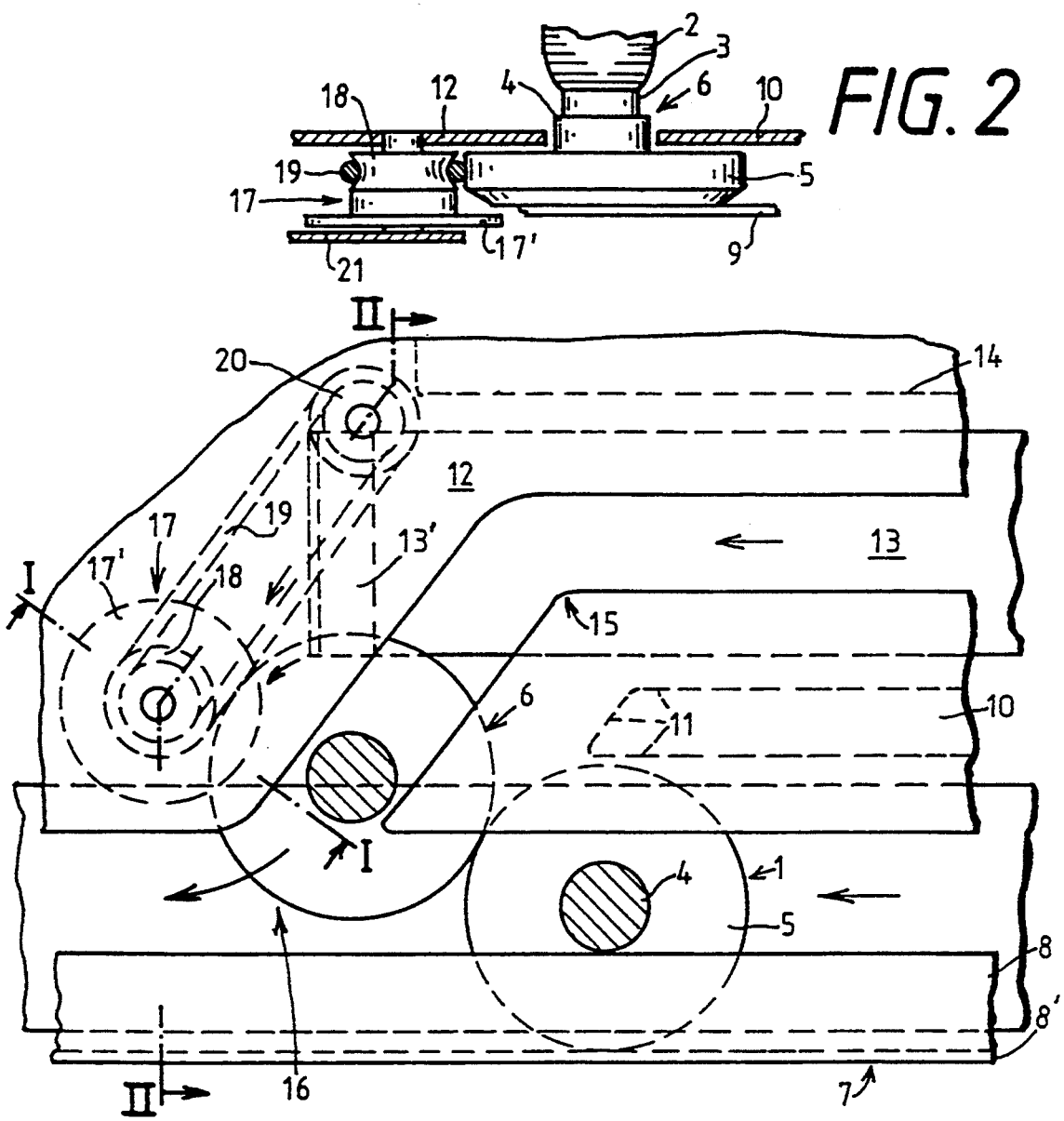
FIG. 2
FIG. 1
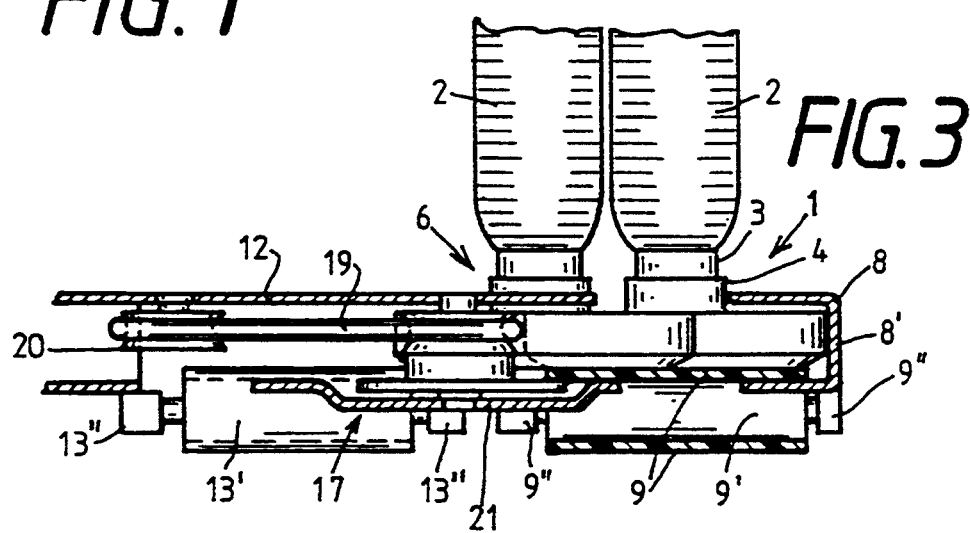
FIG. 3

TRANSPORT SYSTEM FOR MUTUALLY INDEPENDENT CADDIES

The invention relates to a transport system for mutually independent caddies which carry bobbins or bobbin tubes and have base plates with which they stand on a moving surface, in particular the surface of a conveyor belt, carrying them along their transport path by frictional engagement.

Many publications, such as Japanese Patent Application No. 52-25 139 or German Published, Non-Prosecuted Application DE 32 35 442, corresponding to U.S. Pat. Nos. 4,544,107 and 4,595,152, discloses transporting mutually independent caddies which have bobbins or bobbin tubes by means of a base plate and a spindle. The individual carriers are driven along by surfaces moving in the transport direction, such as conveyor belts or rollers, by frictional engagement. In order to assure that they keep to the transport path, C-shaped rails are disposed on either side of the transport path, as a rule forming a guide slit in which the caddies are guided along a pedestal-like structure that is disposed between the base plate and the spindle.

Such a transport system is well-suited to automation. However, a backup of independent caddies can block the transport path completely. Such a backup can, for instance, arise at a converging point or junction where one transport path joins another, if two caddies arrive at the converging point at the same time. The backup can then continue to grow, extending upstream, in both of the transport paths that converge at the point or junction and can very quickly lead to the undersupply of cops to a bobbin winder, for instance, or of empty tubes to a spinning machine.

It is accordingly an object of the invention to provide a transport system for mutually independent caddies, which overcomes the hereinafore-mentioned disadvantages of the heretofore-known devices of this general type and which effectively prevents backups from occurring at converging points.

With the foregoing and other objects in view there is provided, in accordance with the invention, a transport system for mutually independent caddies carrying bobbins or bobbin tubes and having base plates, comprising one transport path, another transport path entering the one transport path at a converging point, moving surfaces, in particular surfaces of conveyor belts, for carrying the caddies along the transport paths by frictional engagement, with the caddies standing on the base plates, and at least one additional contact surface disposed at the converging point, for touching a caddy passing through the converging point and imposing or forcing an additional motion component upon the caddy.

The invention is based on the recognition that the caddies arriving simultaneously at a converging point generate oppositely directed force components, which cancel one another out and cause jamming up of these caddies between the peripheral boundaries of their transport paths. In order to undo this equilibrium, it is necessary to impose an additional motion component upon at least one of the caddies.

In order to break up the backup, it does not matter which caddy is allowed to move forward first. However, it is naturally possible for the "right of way" to be assigned in compulsory fashion by purposefully imposing the additional motion component upon one of the two caddies.

In accordance with another feature of the invention, the additional contact surface is another moving surface acting upon the periphery of the caddies by frictional engagement, in the vicinity of the converging point.

This provides an especially effective way of attaining the additional motion component in the context of the present invention. It lends this caddy not only the transport component of the intended transport direction that acts centrally upon it, but also a torsional component, which causes rolling and thus causes the destruction of the afore-mentioned equilibrium of the resultant forces. Basically, one caddy rolls at the periphery of its base plate along the periphery of the base plate of the other caddy. Intrinsically, this is necessary only until such time as the caddy has left this "jamming position".

However, if backups are to be broken up rapidly, it is advantageous if the torsional motion is imparted to one of the caddies during the entire phase of its passage through the converging point. A drive pulley disposed at the converging point is highly suitable for this purpose. Therefore, in accordance with a further feature of the invention, there is provided a drive pulley disposed at the converging point for driving the other moving surface.

In accordance with an added feature of the invention, there is provided a belt extending over a limited length upstream of the converging point and forming the other moving surface acting upon the periphery of the caddies, the drive pulley being a belt pulley driving the belt.

Through the use of such a belt that extends over part of the transport path as far as the converging point, it is moreover possible to lend the caddy, moving along this belt, a torsional motion even before it reaches the converging point, so that the aforementioned balance of the resultant forces, producing the jamming of two caddies, is not even allowed to occur in the first place.

In accordance with an additional feature of the invention, the drive pulley is driven by one of the moving surfaces on which the caddies stand during transport.

Therefore, the drive of the drive pulley or belt can be derived in a simple way from one of the moving surfaces for caddy transport. Additional drive means can accordingly be dispensed with.

In accordance with a concomitant feature of the invention, there are provided transport channels carrying the caddies along the transport paths, one of the transport channels being widened and having an outwardly decreasing height upstream of the converging point, for pressing a caddy being deflecting outward due to another caddy simultaneously arriving at the converging point from the other of the transport channels, more strongly against the moving surface and reinforcing a driving force in a peripheral region of the moving surface.

It is therefore seen that in a variant of the invention, a torsional motion can be transmitted to one of the caddies by giving it a stronger frictional contact, outside its center, with the moving surface transporting it. In this way, a torsional component is likewise superimposed upon the motion in the transport direction, and the corresponding effect according to the invention is attained.

Other features which are considered as characteristic for the invention are set forth in the appended claims.

Although the invention is illustrated and described herein as embodied in a transport system for mutually independent caddies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, plan view of a converging point of a transport path entering another transport path;

FIG. 2 is a fragmentary, longitudinal-sectional view taken along the line I—I of FIG. 1 in the direction of the arrows;

FIG. 3 is another fragmentary, longitudinal-sectional view taken along the line II—II of FIG. 1 in the direction of the arrows;

Figure 5:
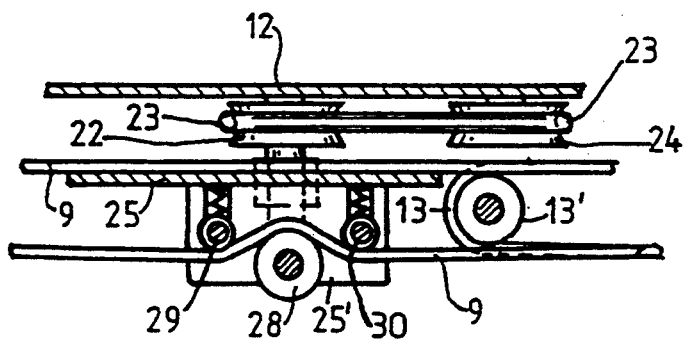
FIG. 5 is a fragmentary, longitudinal-sectional view taken along the line I—I of FIG. 4 in the direction of the arrows.

Referring now to the figures of the drawing in detail and first, particularly, to FIGS. 1-3 thereof, there is seen a first variant of the invention in which a secondary transport path 15 converges with a main transport path 7 and forms a converging point or junction 16. A conveyor belt 9, which carries along caddies or cop supporting trays 1 by frictional engagement in a direction of motion of the conveyor belt 9, is guided along the main transport path 7. The caddies 1 are guided laterally on base plates 5 thereof by a guide edge 8' of a guide rail 8 and a guide edge 11. To that end, the spacing of the guide edges 8' and 11 is slightly greater than the outside diameter of the base plates 5 of the caddies 1.

The caddies 1 include the base plate 5, a pedestal-like structure 4, and a spindle which is hidden in the drawings by a cop 2 or its tube 3. An upper edge of the pedestal simultaneously acts as a support surface for the bottom of the tubes 3. Naturally, these caddies may also transport tubes 3 without any yarn package on them.

The guide rail 8 has a C-shaped guide profile with a lower horizontal part on which the conveyor belt 9 rests and an upper horizontal part which is disposed a slight distance above the surface of the base plate 5 of the caddies 1 resting on the conveyor belt 9, in order to prevent tipping of the caddies 1 during transport.

On the opposite side, a guide profile is formed by a cover plate 10, the aforementioned guide edge 11, and a bottom plate 21. The cover plate 10 and the upper horizontal part of the guide profile of the guide rail 8 form a gap above the conveyor belt 9. This gap must be greater than the diameter of a pedestal 4 of the caddies 1, in order to allow them to pass freely though it.

The secondary transport path 15 has a conveyor belt 13 for transporting caddies 6 to the converging point 16. The caddies 6 are constructed identically to the caddies 1. They have been provided with a different reference numeral solely for the purpose of unequivocally associating them with a transport path that is different from the path of the caddies 1.

The guidance of these caddies 6 on the secondary transport path 15 is effected by a guide edge 14 and the guide edge 11. The edge 11 forms a frame and is also part of the main transport path 7, as already shown. The cover plate 10 and a cover plate 12 are again disposed above the secondary transport path 15 and are parts of both transport paths 7 and 15.

One deflecting roller 9' of the conveyor belt 9 is shown and one deflecting roller 13' of the conveyor belt 13 is shown. Non-illustrated deflecting rollers disposed on the other end of each belt are provided with a non-illustrated drive mechanism that drives them continuously.

Along a last transport segment of the secondary transport path 15, which is a portion extending parallel to the main transport path 7 and leading to the converging point 16, one of the lateral guide edges for the caddies 6 is formed by a cord-type belt 19. This cord 19 is moved by a pulley or disk 18 which is part of a drive pulley 17, in the direction indicated by an arrow in FIG. 1, or in other words toward the converging point 16. As a result, besides the motion in the transport direction, a counterclockwise torsional motion is additionally imposed upon the caddy 6. In the example shown, this caddy 6 rolls in this manner on the caddy 1 which has moved along the main transport path 7 and reached the converging point 16. This gives this caddy 6 the "right of way". However, at the same time as it moves increasingly far into the main transport path 7, the frictional engagement of the caddy 6 and the conveyor belt 9 becomes increasingly forceful. This accelerates the motion, represented by the arrow, from the secondary transport path 15 into the main transport path 7. In this way, the length of time that the caddy 1 is at a standstill on the main transport path 7 can be shortened to a minimum.

In this case the drive of the drive pulley 17 is effected by a friction disk 17', which has a top that rests against the lower surface of the upper, carrying run or race of the conveyor belt 9. As a result, the linear motion of the conveyor belt 9 is converted into a rotary motion of the drive pulley 17, in a very simple way. The cord 19, which is driven by the belt pulley 18 as has already been explained, is deflected on its other end by a passive belt pulley 20, and as a result its active or carrying run extends along the last portion of the secondary transport path 15 up to the converging point 16. The drive pulley 17 and the belt pulley 20 are supported on the bottom plate 21 and the cover plate 12. The bottom plate 21 also has a bearing 13" for the deflection roller 13' and a bearing 9" for the deflection roller 9'.

Figure 4:
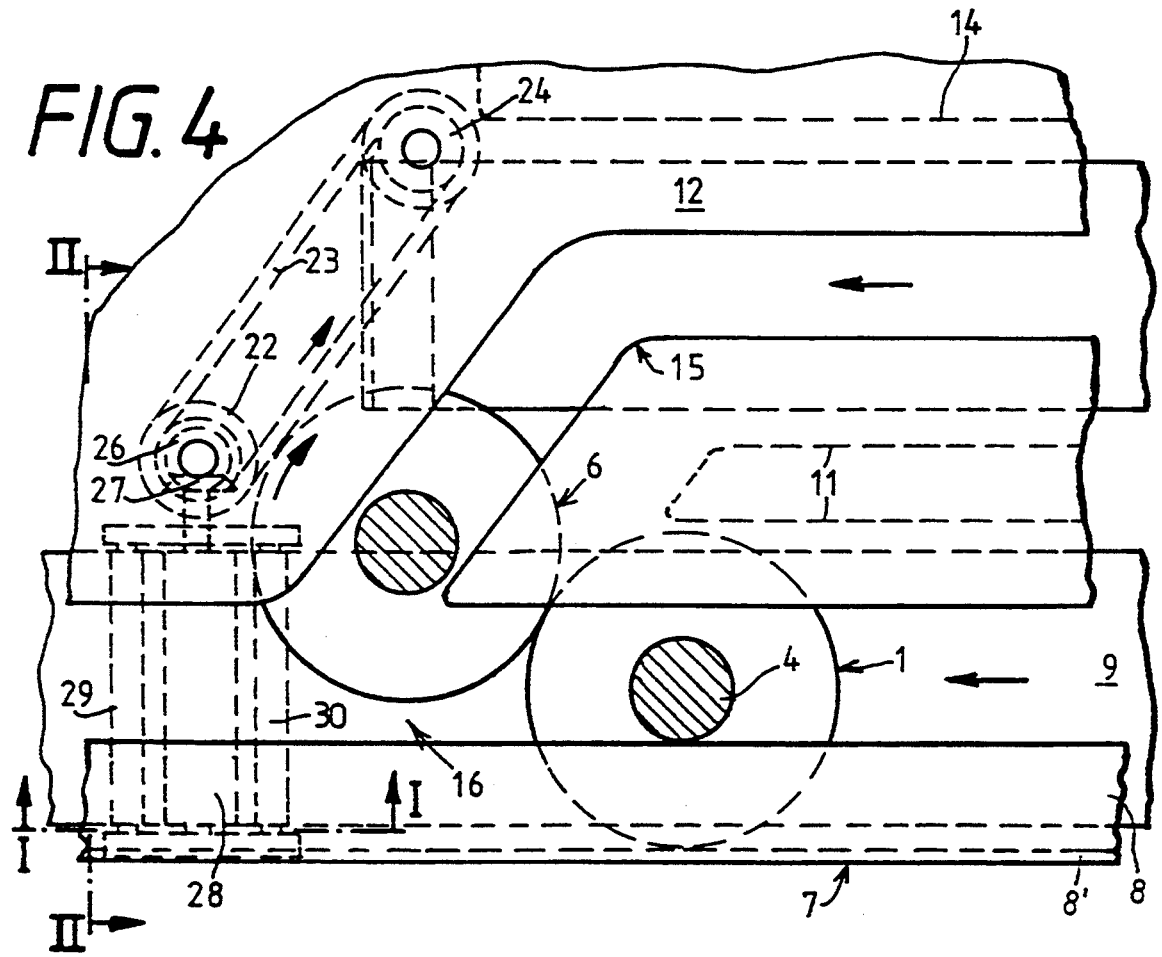
FIG. 4 is a fragmentary, plan view of a converging point with an alternative drive for a drive pulley.
Figure 6:
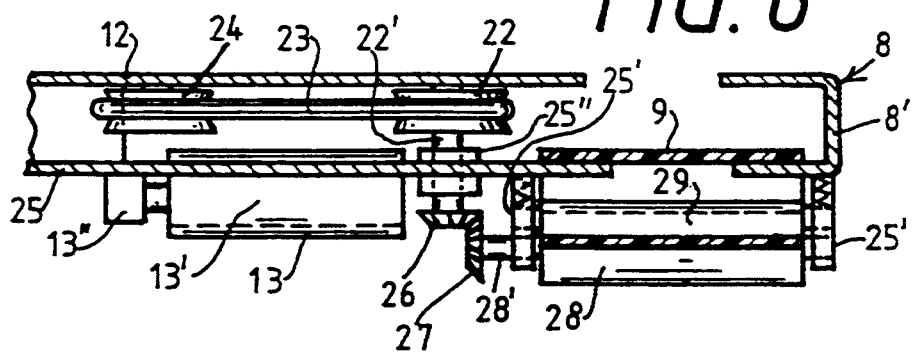
FIG. 6 is another fragmentary, longitudinal-sectional view taken along the line II—II of FIG. 4 in the direction of the arrows.

In a second exemplary embodiment, which is shown in FIGS. 4-6, a belt pulley 22 for a cord-type belt 23 acts as a drive roller and is driven by a cone wheel drive. To that end, a drive roller 28 is pressed against the lower, slack run or race of the conveyor belt 9 of the main transport path 7. In order to make this drive as slip-free as possible, two tensioning rollers 29 and 30 are provided adjacent this drive roller 28. The tensioning rollers 29 and 30 tighten the transport belt and additionally increase the wrap angle around the drive roller 28. These tensioning rollers 29 and 30 may be resiliently supported, as is usual for that purpose. This support has merely been suggested in dashed lines in FIG. 5.

A toothed cone wheel 26 is disposed on the end of a shaft 22' opposite the belt pulley 22 and meshes with a likewise toothed cone wheel 27 disposed at right angles to it. The cone wheel 27 is mounted on a shaft 28' of the drive roller 28. In order to support the drive roller 28 and the tensioning rollers 29 and 30, brackets or arms 25' of a bottom plate 25 are provided. The shaft 22' of the belt pulley 22 is rotatably supported in the bottom plate 25 as well, through a bearing 25''. Due to the drive mechanism provided in this variant of the invention, a reversal of rotary direction of the driving belt pulley 22 is obtained as compared with the first variant. As a result, the cord 23 transports counter to the transport direction of the caddy 6. In this way, as the caddy arrives at the converging point 16, it is rotated clockwise by the cord 23. This rotary motion is further reinforced by the contact of the base plate 5 with the conveyor belt 9. In this case as well, this strong torsional motion assures the prevention of a backup at the converging point and assures the "right of way" of caddy 6 over the caddy 1, even if the rotary motion of the caddy 6 means that the peripheral surface of the base plate 5 of the caddy 6 slides along the base plate of the caddy 1, instead of rolling along on the caddy 1. This frictional motion of the two smooth jacket surfaces of the base plate 5 is negligible as compared with the torsional force jointly attained by the cord 23 and the conveyor belt 9.

Figure 7:
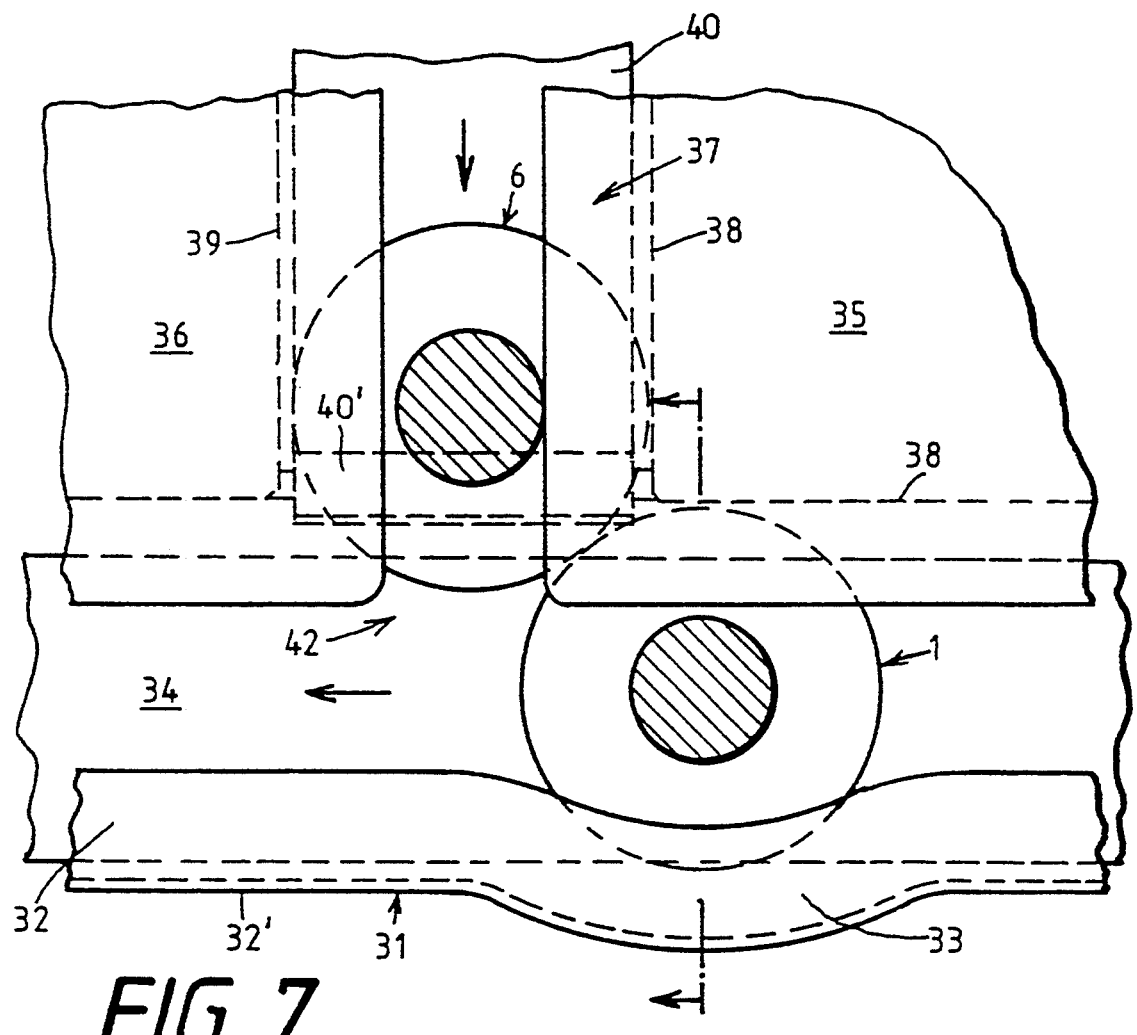
FIG. 7 is a fragmentary, plan view of a converging point of a transport path entering another transport path with a different shaping of a transport channel for increasing the frictional engagement on one caddy.
Figure 8:
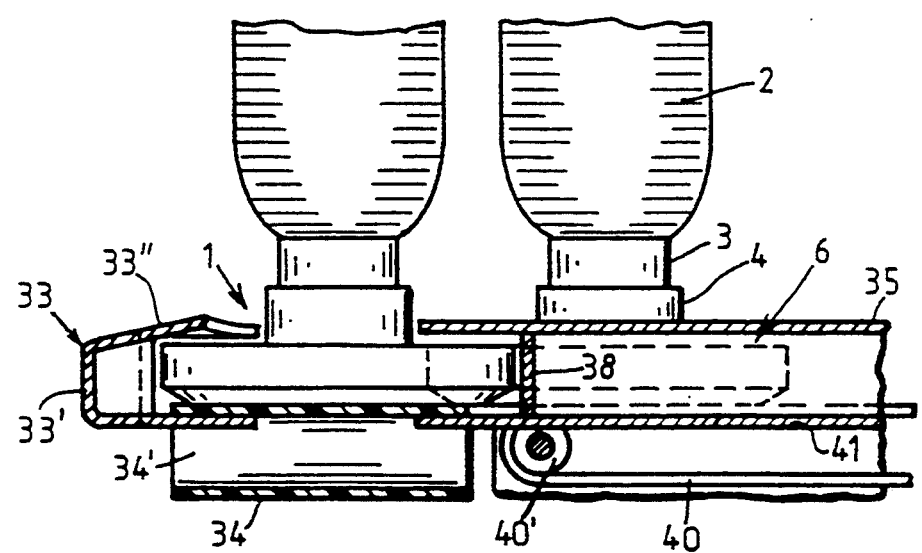
FIG. 8 is a longitudinal-sectional view of FIG. 7.
Figure 9:
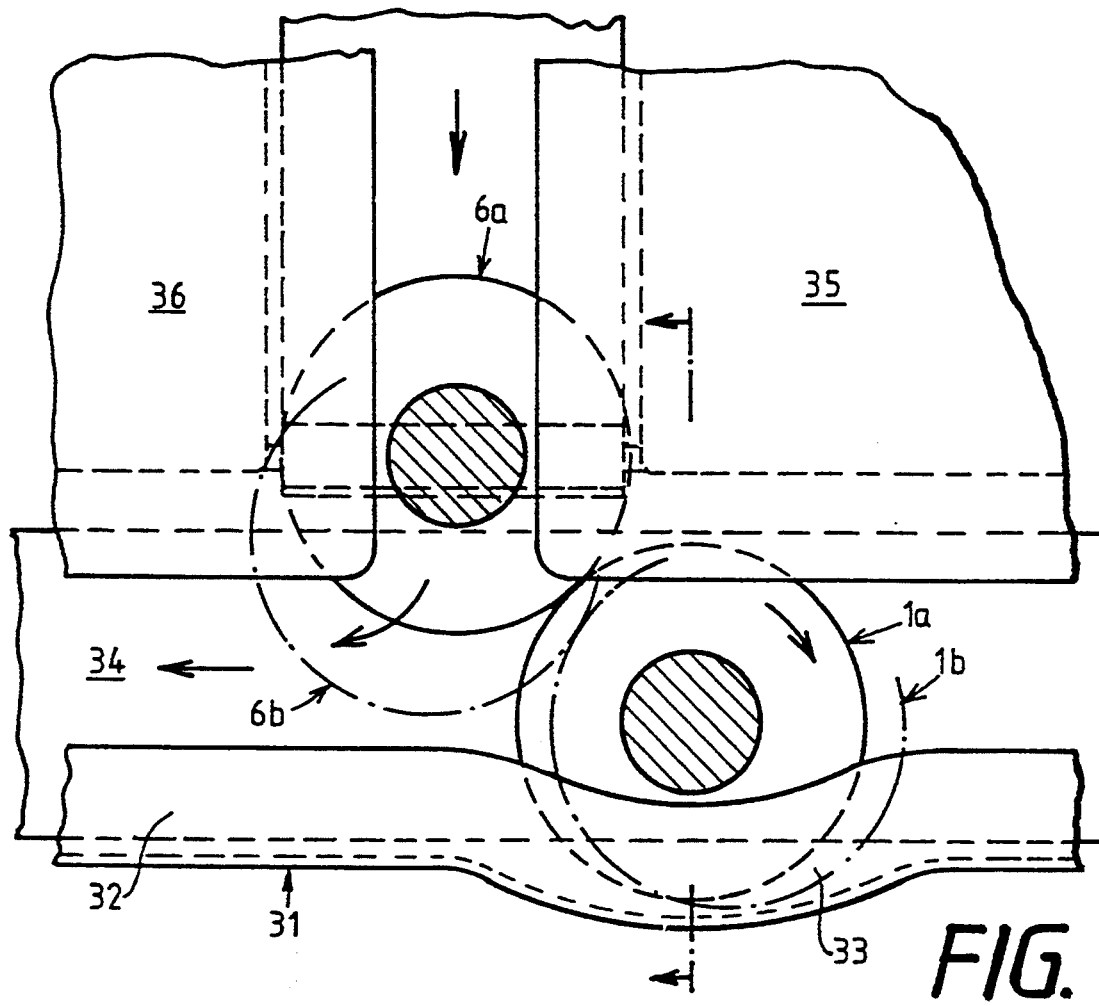
FIG. 9 is a fragmentary, plan view of the converging point of FIG. 7 in an ensuing phase of motion.
Figure 10:
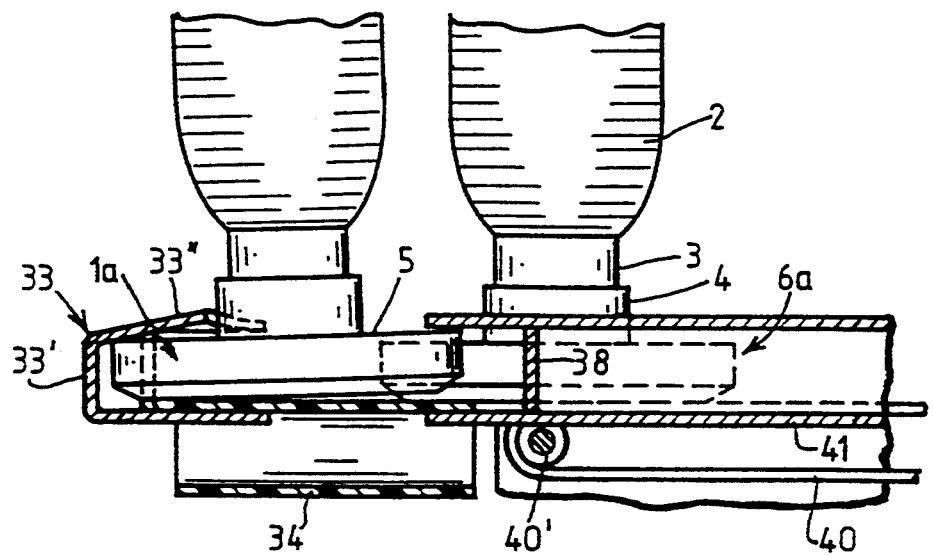
FIG. 10 is a longitudinal-sectional view of FIG. 9.

A third variant of the invention is shown in FIGS. 7-10. FIGS. 7 and 8 on one hand, and FIGS. 9 and 10 on the other hand, each show different phases of motion. In this example, a form of the converging point differing from the previous embodiments has been selected, in which a secondary transport path 37 enters a main transport path 31 at a right angle. This is merely intended to demonstrate the fact that the invention is not limited to a special form of a converging point. In any case, this is not intended to imply that for a certain shape of converging point, only a particular one of the variants of the invention might be applicable. Instead, both the variants described above and the variant to be described below can be employed for all conceivable forms of converging points.

It should also be noted at this point that the terms main and secondary transport path have been selected only by way of example. The straight, through transport path has been called the main transport path, and the transport path converging with it has been called the secondary transport path. However, depending on the way in which the transport system is constructed, the converging transport path may also be the main transport path.

In the view shown in FIGS. 7 and 8, a caddy 1 on the main transport path 31 and a caddy 6 on the secondary transport path 37 are just now meeting.

If a profile of a guide rail or transport channel 32 were constructed in a straight line toward a converging point 42 as usual, then in the phase of motion shown, a backup could form in that situation, because none of the caddies 1 or 6 could reach the converging point 42. It is therefore necessary to destroy the equilibrium of the force components that would be been created.

A bulge 33 permits the caddy 1 to deflect transversely relative to the transport direction of a conveyor belt 34 of the main transport path 31. As a result, with the aid of a conveyor belt 40, the caddy 6 is moved first to a position 6a shown in FIGS. 9 and 10 while the caddy 1 is deflected to a position 1a.

The bulge 33 has a guide edge 33' with an oblique cover plate region 33'', which provides for a decreasing height of a guide profile or channel in the bulge 33. As is shown particularly clearly in FIG. 10, the caddy displaced into the position 1a is canted somewhat by this cover plate region 33'', as a result of which it is lifted from the conveyor belt 34 on the side opposite the guide profile of the bulge 33, while at the same time in the region of the bulge 33, it is pressed against the conveyor belt 34 to a reinforced extent. The fact that the surface of the conveyor belt 34 is rougher than the lower surface of the cover plate region 33'' assures the increase in frictional engagement between the conveyor belt 34 and the base plate 5 of the caddy 1 in the peripheral region. As a result, a clockwise torsional motion is imparted to the caddy 1 which is additionally reinforced by the shear force of the caddy 6 from the secondary transport path 37. This caddy 1 is then deflected to a position 1b, as a result of which the caddy 6 can assume a position 6b and can then fully enter the transport path 31.

As soon as the caddy has been transported away from the converging point 42, the caddy 1 is fed out of the bulge 33 by the conveyor belt 34, because it no longer meets any resistance in the transport direction. To that end, it is advantageous if the bulge 33 is constructed in such a way that a downstream portion of the oblique cover plate region 33'' again has an increasing height.

The remainder of the transport paths are constructed in accordance with the examples given above. Therefore, the caddies 1 and 6 are laterally guided by guide edges 38 and 39 as well as 32'. Applicable horizontal parts of the guide profile of the guide rail 32 and cover plates 35 and 36 are also present. No deflecting rollers are shown for the conveyor belt 34, for the sake of simplicity, while one deflecting roller 40' can be seen for the conveyor belt 40. Instead of the use of a cord-type belt in the first two examples, it is also possible to merely use a drive roller, which is disposed in place of the drive roller 17 of FIG. 1 and has a circumferential surface with a friction lining at the level of the belt pulley 18. This kind of drive roller would intrinsically already be adequate because it could lend the caddy 6 a torsional motion at the critical point of the converging point. It is equally possible within the scope of the invention for the various contact surfaces for lending an additional motion component to be disposed at different points of the converging points and thereby to transmit the torsional motion to the respectively other caddy. In addition, other contact surfaces may also be disposed in such a way that they transmit an additional motion to both of the arriving caddies. This additional motion need not necessarily be a torsional motion.

We claim:

1. A transport system for mutually independent caddies carrying bobbins or bobbin tubes and having base plates, comprising:
   one transport path,
   another transport path entering said one transport at a converging point, moving surfaces for carrying the caddies along said transport paths by frictional engagement, with the caddies standing on the base plates, at least one additional contact surface disposed at said converging point, for touching a caddy passing through said converging point and imposing an additional motion component upon the caddy; and transport channels carrying the caddies along said transport paths, one of said transport channels being widened and having an outwardly decreasing height upstream of said converging point, for pressing a caddy being deflected outwardly due to another caddy simultaneously arriving at said converging point from the other of said transport channels, more strongly against said moving surface and reinforcing a driving force in a peripheral region of said moving surface.

2. The transport system according to claim 1, including conveyor belts having said moving surfaces.

3. The transport system according to claim 1, wherein said additional contact surface is another moving surface acting upon the periphery of the caddies by frictional engagement, in the vicinity of said converging point.

4. The transport system according to claim 3, including a drive pulley disposed at said converging point for driving said other moving surface.

5. The transport system according to claim 4, including a belt extending over a limited length upstream of said converging point and forming said other moving surface acting upon the periphery of the caddies, said drive pulley being a belt pulley driving said belt.

6. The transport system according to claim 4, wherein said drive pulley is driven by one of said moving surfaces on which the caddies stand during transport.

* * * * *